June 3, 1958  E. E. HOOD  2,837,187
SEMI-AUTOMATIC TWO-SPEED COASTER BRAKE
FOR BICYCLES AND THE LIKE
Filed Sept. 4, 1956  2 Sheets-Sheet 1

INVENTOR.
Edwin Elliott Hood
BY
Clinton S. Janes
ATTORNEY

June 3, 1958

E. E. HOOD 2,837,187

SEMI-AUTOMATIC TWO-SPEED COASTER BRAKE
FOR BICYCLES AND THE LIKE

Filed Sept. 4, 1956

INVENTOR.
Edwin Elliott Hood
BY
Clinton S. James
ATTORNEY

WITNESS:
Esther M. Stockton 2,837,187
Patented June 3, 1958

United States Patent Office

2,837,187
SEMI-AUTOMATIC TWO-SPEED COASTER BRAKE FOR BICYCLES AND THE LIKE

Edwin Elliott Hood, Elmira, N. Y., assignor to Bendix Aviation Corporation, Elmira Heights, N. Y., a corporation of Delaware Application September 4, 1956, Serial No. 607,750

10 Claims. (Cl. 192—6)

The present invention relates to a semi-automatic two-speed coaster brake for bicycles and the like, and is a further adaptation of some of the principles disclosed in applicant's prior application Ser. No. 566,449, filed February 20, 1956, to a different form of brake and change-speed control mechanism.

It is an object of the present invention to provide a novel device of the above character which is efficient and reliable in operation, and simpler and more economical in construction and assembly than similar devices previously known.

Further objects and advantages will be apparent from the following description taken in connection with the accompanying drawing in which.

Figure 1:
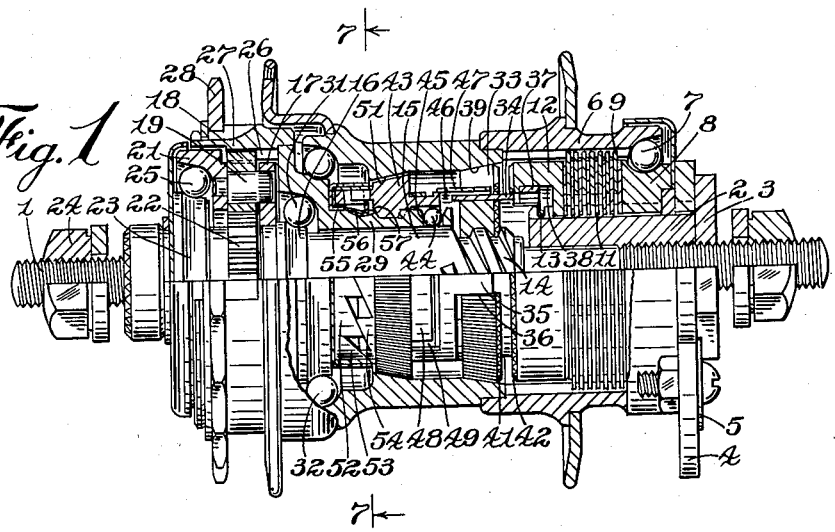
Fig. 1 is a side elevation partly broken away and in section of a preferred embodiment of the invention showing the parts in the position assumed when the bicycle is being operated forwardly in low gear.
Figure 2:
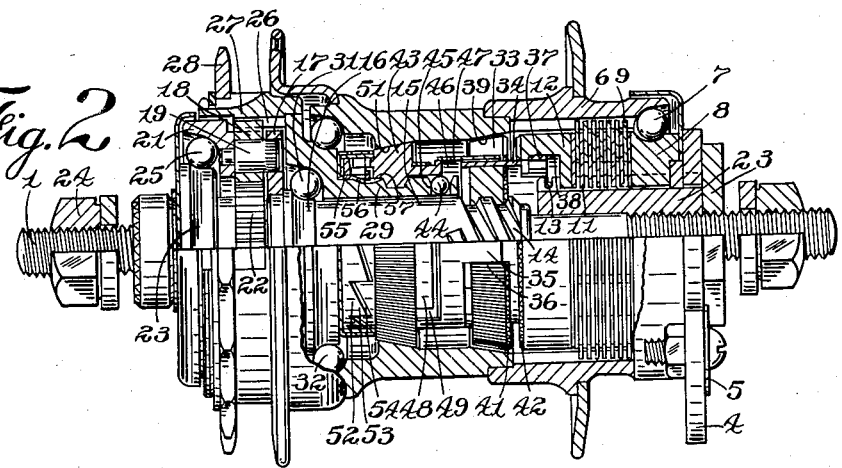
Fig. 2 is a view similar to Fig. 1 showing the parts operating in high gear.

In Fig. 1 of the drawing there is illustrated a fixed axle 1 on which an anchor member 2 is adjustably mounted, being immobilized by a lock nut 3 and a brake arm 4 fixedly mounted on the anchor member and connected to the frame of the bicycle by an arm clip 5.

A wheel hub 6 is rotatably mounted at one end on the anchor member 2 by means of bearings 7 resting on a cone member 8 fixedly mounted on the anchor member; and a plurality of brake discs 9 and 11 are splined alternately to the hub and anchor member respectively between the bearing cone 8 and a pressure ring member 12 splined on the anchor member and retained thereon by a lock ring 13.

A low speed screw shaft 14 is journalled on the axle 1 adjacent the anchor member 2, and is provided with an intermediate smooth portion 15, a bearing cone 16, and a planet carrier flange 17 fixedly mounted adjacent the bearing cone. A plurality of planetary pinions 18 are mounted in the carrier 17 on bearing studs 19 fixed at one end in the carrier and at their other ends in a bearing cup member 21. The planets 18 mesh interiorly with a fixed sun gear 22 which is unitary with a bearing cone member 23 adapted to be clamped to the fork of the bicycle frame by a clamp nut 24 threaded on the axle 1. Bearings 25 between the cup 21 and cone 23 provide support for the planetary pinions.

The planets mesh exteriorly with an orbit gear 26 formed in a driving member 27 adapted to be rotated by a sprocket 28. The driving member 27 is formed as a unit with a high-speed screw shaft 29 which is rotatably mounted on the low-speed screw shaft 14 by means of bearings 31 running on the cone 16. Bearings 32 located on the driving member 27 form a rotatable support for the adjacent end of the hub 6.

A low speed driving clutch and brake applying member 33 (Fig. 3) is threaded on the low-speed screw shaft 14 for longitudinal movement thereon, rotary movement thereof being resisted by a retarder 34 (Fig. 5) having fingers 35 received in slots 36 in the member 33, and having spring arms 37 bearing frictionally in an internal groove 38 in the pressure ring 12. The arrangement is such that forward rotation of the low speed screw shaft 14 traverses the low-speed clutch member 33 to the left into frictional engagement with a conforming clutch surface 39 in the interior of the hub 6, while backward rotation of said screw shaft traverses the member 33 into engagement with the pressure ring 12. The adjacent surfaces of the clutch member 33 and pressure ring 12 are provided with mating teeth 41 and 42 respectively whereby after such engagement, rotation of the member 33 is positively prevented, and further backward rotation of the screw shaft causes the brake discs 9, 11 to be compressed against the cone member 8 to retard the rotation of the hub.

A high speed driving clutch member 43 (Fig. 3) is threaded on the high speed screw shaft 29, being retained thereon by a removable abutment in the form of a ball 44 seated in an opening 45 in the high speed screw shaft and retained therein by resting on the low speed screw shaft 14 when in assembled position.

Means are provided for frictionally resisting rotation of the high speed driving clutch member 43 in the form of a retarder sleeve 46 (Fig. 5) having fingers 47 received by slots 36 of the low speed driving clutch member 33, and having spring arms 48 bearing frictionally on the surface 49 of the high speed driving clutch member. Forward rotation of the high speed screw shaft 29 while the high speed driving clutch member is thus hindered from rotation traverses said clutch member 43 into clutching engagement with a conforming clutch surface 51 in the interior of the hub 6.

The design and construction of the retarder 46 is such that the frictional drag of its arms 48 on the high speed driving clutch member 43 is substantially less than the torque capacity of the frictional connection of the low speed driving clutch member 33 with the ring member 12 provided by the retarder 34. The traversal of the member 33 is thus always under the control of the retarder 34, irrespective of any torque which may be transmitted to the member 33 from the high speed clutch member 43 by its retarder 46.

Figure 3:
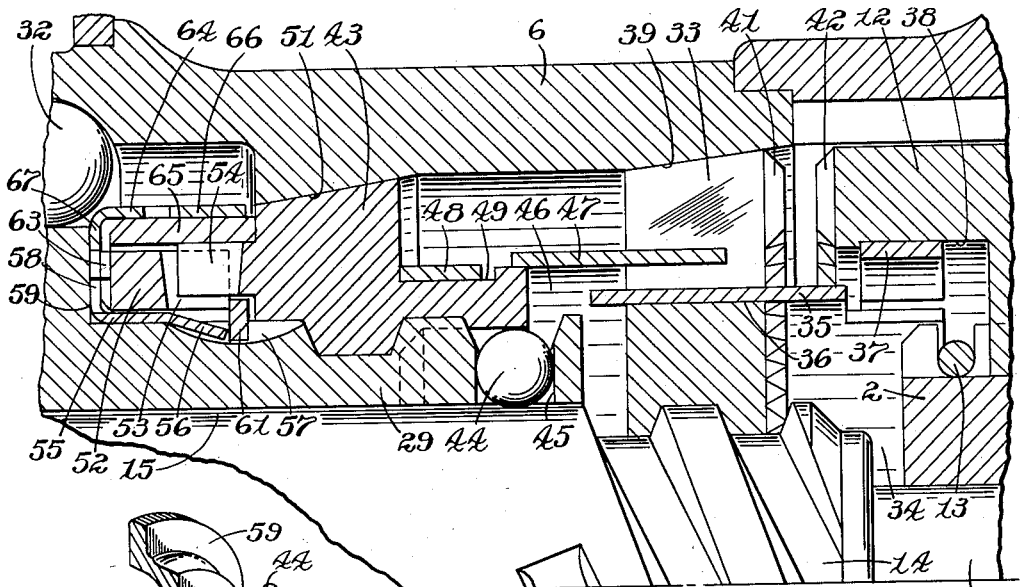
Fig. 3 is an enlarged sectional detail of the gear selector device and related elements showing the parts in high gear position.
Figures 4, 6:
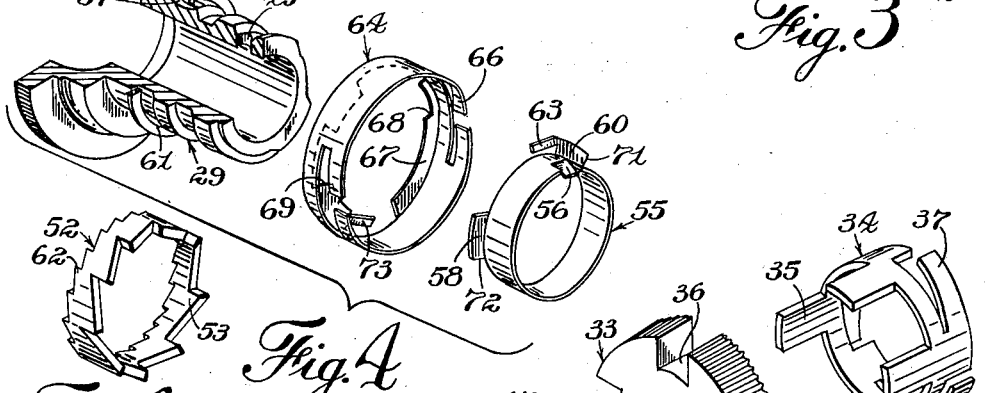
Fig. 4 is an exploded detail in perspective of the driving member and high speed screw shaft, the indexing cup and the selector ring, the driving member being shown partially in section.
Fig. 6 is a detail in perspective of the indexing sleeve.
Figure 5:
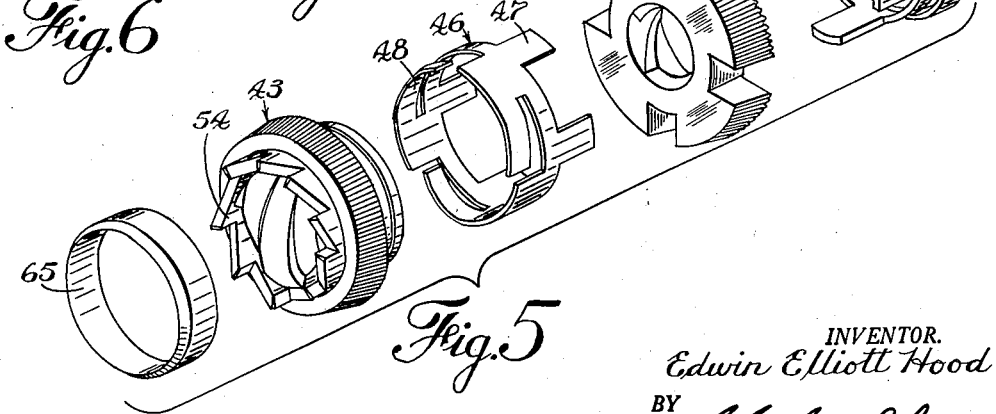
Fig. 5 is an exploded perspective view of the high speed and low speed driving clutch elements with their frictional retarding devices.

Means under the control of the operator is provided for alternatively permitting or preventing engagement of the high speed driving clutch member 43 with the hub 6. As best shown in Figs. 4, 5 and 6, this means comprises a selector sleeve 52 in the path of engaging movement of the high speed driving clutch member 43 having a plurality of inclined abutment projections 53 adapted to cooperate with similar projections 54 on said high speed driving clutch member. The selector sleeve 52 is journalled on a selector ring 55 non-rotatably mounted on the high speed screw shaft 29 by means of a tongue 56 (Fig. 3) entering a longitudinal slot 57 in said screw shaft. The selector ring is provided with flanges 58 and 60 which bear against a shoulder 59 on said screw shaft and are retained in engagement therewith by a lock ring 61.

The selector sleeve 52 is provided with ratchet teeth 62, and the flange 60 of the selector ring 55 is cut away to form a spring pawl 63 (Fig. 4) adapted to cooperate with said ratchet teeth. There are twice as many ratchet teeth 62 as there are projections 53 on the selector sleeve 52, and the pawl 63 of the selector ring is so related to said ratchet teeth that when the selector sleeve is rotated by means of said pawl and ratchet connection as described hereafter, the projections 53 are alternately brought into and out of registry with the spaces between the projections 54 on the high speed driving clutch member. When the projections 53 register with said spaces between the projections 54, the high speed driving clutch member 43 is permitted to traverse to the left into driving engagement with the hub 6 as shown in Fig. 3. Alternatively when the selector sleeve 52 is rotated out of such registering position, the projections 53 engage with the projections 54 and prevent the engagement of the high speed clutch as shown in Fig. 1.

In order to secure the indexing of the selector sleeve 52 by alternative forward and backward rotation of the high speed screw shaft 29 by the operator, an indexing cup 64 (Fig. 4) is rotatably mounted on an annular collar 65 (Fig. 3) fixedly mounted on the high speed driving clutch member 43. The indexing cup is provided with spring fingers 66 bearing frictionally on the collar 65 to transmit rotation from said clutch member to the indexing cup.

Figure 7:
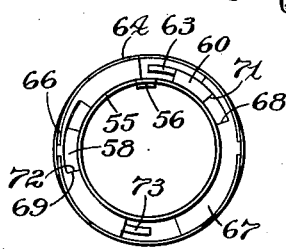
Fig. 7 is a section through the indexing cup, and the selector ring taken on the line 7—7 of Fig. 1 showing their relationship during forward rotation of the driving mechanism.
Figure 8:
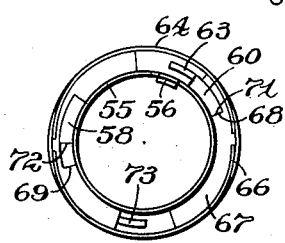
Fig. 8 is a view similar to Fig. 7 showing the relationship of the parts after back-pedalling.

The indexing cup is provided with a flange 67 (Fig. 4) located in the same radial plane with the flanges 58 and 60 of the selector ring 55 when the parts are assembled. Flange 67 is formed with a shoulder 68 which is positioned to engage a shoulder 71 on flange 60 of the selector ring 55, and also has a shoulder 69 positioned to engage a shoulder 72 on flange 58 of the selector ring. As best seen in Figs. 7 and 8 of the drawing these shoulders are so spaced as to permit relative rotation of the indexing cup and selector ring through an angle corresponding to one ratchet tooth 62 on the selector sleeve 52.

The flange 67 of the indexing cup is also formed to provide a spring pawl 73 (Fig. 4) positioned to engage the ratchet teeth 62 of the selector sleeve. As shown in Fig. 3, the lock ring 61 extends radially a sufficient distance to engage the selector sleeve 52 and thereby hold the selector sleeve and the indexing cup in assembled position with the pawl 63 on the selector ring 55 and the pawl 73 on the indexing cup 64 both engaging the teeth 62 of the selector sleeve.

The frictional drag of the spring fingers 66 on the collar 65 is substantially less than the frictional connection of the high speed clutch member 43 with the low speed clutch member 33 provided by the retarder 46. The traversal of the high speed clutch member is therefore always under the control of the retarder 46, regardless of any torque transmitted to or from the indexing cup 64.

In operation, starting with the parts in the low gear driving positions as shown in Fig. 1, it will be noted that the high speed driving clutch member 33 is held out of engagement with the hub 6 by reason of the interference to travel of said clutch member to the left caused by the engagement of the projections 54, 53 on said clutch member and the selector sleeve 52 respectively. Under these circumstances forward rotation of the driving member 27 by the sprocket 28 is transmitted through the planetary reduction gearing to the low speed screw shaft 14 which causes the low speed driving clutch member 33 to engage and rotate the hub 6. The vehicle may thus be propelled in low gear with intervals of coasting if so desired by the operator, but so long as the oper-
ator does not rotate the driving member backward, the hub will stay in low gear position.

When the operator desires to shift into high gear, he rotates the driving member 27 backward through a small angle, not sufficient to cause the low speed driving clutch member to apply the brake as above described. When this happens, the high speed driving clutch member 43 does not rotate with the high speed screw shaft 29 by reason of its frictional connection through the retarder sleeves 46 and 34 to the non-rotatable presser member 12. Since the high speed driving clutch member 43 does not rotate, the indexing cup 64 also remains stationary by reason of its frictional connection with the collar 65. The selector sleeve 52 is therefore also prevented from backward rotation by the engagement of the pawl 73 of the indexing cup with a ratchet tooth 62 of the indexing sleeve. Since the selector ring 55 is fixedly mounted on the high speed screw shaft 29 it rotates backward with said screw shaft. This causes its pawl 63 to move backward one tooth 62 on the selector sleeve 52.

The amount of such relative movement of the selector ring 55 and selector sleeve 52 is determined by the engagement of the shoulders 68, 71 on the flanges 67 and 69 of the indexing cup and selector ring respectively. Fig. 7 represents the relative position of these members before such backward rotation, and Fig. 8 shows the positions of the members and engagement of said shoulders when the desired relative movement has been accomplished. It will be understood that any further backward rotation of the driving member 27 beyond that necessary to accomplish the indexing action merely causes the selector ring 55 to rotate the indexing cup 64 backward with it by reason of engagement of said shoulders overcoming the frictional connection of the indexing cup with the collar 65.

Upon subsequent forward rotation of the driving member by the operator, the pawl 63 on the selector ring 55, by engagement with a ratchet tooth 62, rotates the selector sleeve 52 in a forward direction through the angle of one ratchet tooth as determined by engagement of shoulder 72 on the selector ring with shoulder 69 on the indexing cup 64. This rotary adjustment brings the abutments 53 of the selector sleeve into registry with the spaces between the abutments 54 of the high speed driving clutch member 43. The latter is thus permitted to be traversed into clutching engagement with the hub 6 by the forward rotation of the screw shaft, and thereafter the hub is driven in synchronism with the driving member 27. It will be understood that during such high speed operation, the hub 6 will simply overrun the low speed driving clutch member 33.

Operation in high gear, with intervals of coasting if desired, may be continued by the operator indefinitely. However, if he wishes to shift into low gear it is merely necessary for him to again back pedal through a small angle, after which forward rotation of the driving member will index the selector sleeve through an angle of one ratchet tooth 62 as above described thereby bringing the selector sleeve into interfering relation with the high speed drive clutch member as shown in Fig. 1, and operation in low gear ensues.

Although but one embodiment of the invention has been shown and described in detail it will be understood that changes may be made in the precise form and arrangement of the parts without departing from the spirit of the invention.

I claim:

1. In a semi-automatic two-speed coaster brake for velocipedes and the like, a stationary axle, an anchor member fixed thereon, a low-speed screw shaft rotatably mounted on the axle, a driving member and high-speed screw shaft rotatably mounted on the low-speed screw shaft, speed-reducing gearing connecting the driving member to the low-speed screw shaft, a wheel hub rotatably mounted on the anchor member and the driving member, having high-speed and low-speed interior clutch surfaces, a low-speed driving clutch member threaded on the low speed screw shaft for engagement with the hub responsive to forward rotation of the low-speed screw shaft, a high-speed driving clutch member similarly threaded on the high-speed screw shaft, and means under the control of the operator for holding the high-speed driving clutch member out of engagement with the hub comprising a selector sleeve rotatably mounted on the high-speed screw shaft in the path of engaging movement of the high speed driving clutch member, said clutch member and selector sleeve having equally spaced cooperating projections which, when brought into registry, prevent said clutch member from engaging the hub, said selector sleeve having a set of laterally extending ratchet teeth, and means cooperating with said teeth to index said selector sleeve with respect to the high-speed driving clutch member responsive to relative backward and forward movement of the high-speed screw shaft.

2. A semi-automatic two-speed coaster brake as set forth in claim 1 in which the means for indexing the selector sleeve comprises a selector ring fixedly mounted on the high speed screw shaft having a pawl cooperating with said ratchet teeth on the selector sleeve to transmit forward rotation thereto, and an indexing cup frictionally connected to the high speed driving clutch member having a pawl also engaging said ratchet teeth to oppose backward rotation of the selector sleeve.

3. A two-speed coaster brake as set forth in claim 2 including further a frictional retarder connection between the high-speed driving clutch member and the axle.

4. A two-speed coaster brake as set forth in claim 3 in which the frictional retarder connection between the high speed driving clutch member and the axle is of substantially greater torque capacity than the frictional connection between said clutch member and the indexing cup.

5. A two-speed coaster brake as set forth in claim 2 in which the selector sleeve is journalled on the selector ring, and including further means comprising a lock ring seated in the high-speed screw shaft cooperating with the selector ring and selector sleeve to prevent axial movement of the selector ring, and to press the selector sleeve against said pawls.

6. A two-speed coaster brake as set forth in claim 2 including further a cylindrical collar fixedly mounted on the high-speed driving clutch member surrounding the selector sleeve, the indexing cup being telescoped over said collar and having elastic arms bearing frictionally thereon.

7. A two-speed coaster brake as set forth in claim 1 including further a plurality of braking elements splined alternately to the hub and anchor member, and means actuated by axial movement of the low-speed driving clutch member responsive to backward rotation of the low-speed screw shaft for compressing said braking elements.

8. In a two-speed coaster brake as set forth in claim 7, means for ensuring traversal of the low speed clutch member responsive to rotation of the low speed screw shaft comprising a frictional connection from said clutch member to the axle.

9. A two-speed coaster brake as set forth in claim 8 including further a frictional coupling between the high speed and low speed clutch members, said coupling being arranged to have a torque capacity substantially less than that of the frictional connection from the low speed clutch member to the axle.

10. A two-speed coaster brake as set forth in claim 1 including further an abutment member loosely seated in the high-speed screw shaft limiting declutching movement of the high-speed driving clutch member thereon, said abutment member being confined in said screw shaft between said clutch member and the low-speed screw shaft.

No references cited.